Patented Dec. 2, 1947

2,432,060

UNITED STATES PATENT OFFICE 2,432,060

TRINUCLEAR CYANINE DYES

Alfred W. Anish, Johnson City, N. Y., assignor to General Aniline & Film Corporation, New York, N. Y., a corporation of Delaware No Drawing. Application August 16, 1944, Serial No. 549,787

9 Claims. (Cl. 260—240)

This invention relates to new compounds of the trinuclear cyanine type and to a method of preparing the same.

Cyanine dyes containing more than two nuclei are already known. Dyes of this category are illustrated, for example, in U. S. Patent 2,155,475, and in French Patent 832,352. It will be noted that in the dyes referred to in the United States patent the nucleus appearing in the dye, in addition to the two terminal nitrogenous heterocyclic nuclei, is aromatic in character. On the other hand, in certain of the dyes of the French patent, the third nucleus is heterocyclic and of the type known as rhodanine nucleus. In both types of dyes, however, the third nucleus serves to interrupt the methenyl chain by which the terminal heterocyclic nitrogenous nuclei are linked together.

I have now discovered a new class of trinuclear cyanine dyes in which two heterocyclic nitrogenous nuclei are linked by a monomethine radical and in which the third heterocyclic nitrogenous nucleus, though joined to the monomethine chain, does not serve to interrupt the linkage between the two terminal heterocyclic nitrogenous nuclei. These new dyestuffs have certain significant properties which are not possessed by the known dyestuffs. For instance, the free base as distinct from the salt thereof is in and of itself an excellent sensitizer. Furthermore, upon treatment of the dye base with an alkyl or aryl ester for the purpose of producing the salt of the base, two nitrogen atoms of the dyestuff are quaternized rather than a single nitrogen atom as in the usual cyanine dyes. Due to their particular constitution, the dyes have been found to sensitize over a long region extending in most cases from the blue to the red region of the spectrum.

It is, accordingly, an object of the present invention to provide a new class of trinuclear cyanine bases and the salts thereof.

A further object involves a method of preparing such bases and salts.

A further object is to provide a photographic element comprising an emulsion sensitized with trinuclear cyanine bases and salts thereof.

A still further object is to provide trinuclear cyanine bases and salts thereof which are added to photographic emulsions, or coated thereon as an overcoating, whereby the sensitivity of the photographic emulsion is increased.

Other objects and advantages of this invention will become apparent by reference to the following specification in which its preferred details and embodiments are described.

I have found that when a methylene bis-azole is condensed with a cyanine dye intermediate, dye bases are formed which are excellent sensitizers for photographic emulsions, and which dye bases, upon quaternization, yield dye salts which are likewise excellent sensitizers for photographic emulsions.

The trinuclear cyanine bases and trinuclear cyanine dyes prepared according to the present invention are characterized by the following general formula:

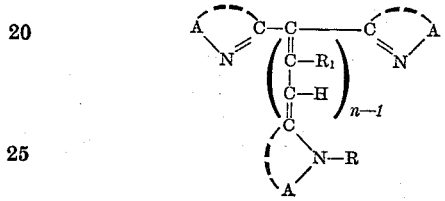

and the quaternary ammonium salts thereof.

In the above formula A represents the atoms necessary to form a ring of the type usual in cyanine dyes, e. g., indolenine, oxazole, pryidine, quinoline, thiazole, thiazoline, tellurazole or selenazole ring, R represents an alkyl radical, e. g., methyl, propyl, butyl, pentyl, hexyl, etc., alkylene radical, e. g., ethenyl (or vinyl), propenyl, butenyl, etc., alkoxy, e. g., methoxy, ethoxy, propoxy, etc., alkoxyalkyl, e. g., methoxyethyl, ethoxyethyl, ethoxypropyl, etc., acetoxyalkyl, e. g., acetoxymethyl, acetoxyethyl, acetoxypropyl, etc., aralkyl, e. g., benzyl, methyl benzyl, ethyl benzyl and the like, $R_1$ represents hydrogen or an alkyl radical of the same value as R, and $n$ represents a positive integer of from one to three.

The process of preparing the above trinuclear cyanine bases and salts thereof, comprises heating under reflux conditions a methylene bis-azole with a cyclammonium quaternary salt, having a reactive group in $\alpha$-position to the N-atom thereof.

The symmetrical methylene bis-azoles used in the preparation of the new dyes, of the present invention, are described in the "Journal of the Chemical Society", 121, p. 464, 1922, and the unsymmetrical methylene bis-azoles are described in U. S. Patent 2,323,503.

The cyclammonium quaternary salt intermediates, which are generally called cyanine dye intermediates, are represented by the general formula:

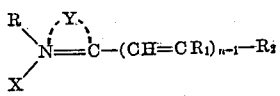

wherein R has the same values given above, X represents an acid radical such as, chloride, bromide, iodide, sulfate, perchlorate, methyl sulfate, ethyl sulfate, p-toluene sulfonate and the like, Y represents the non metallic atoms necessary to complete a five-membered or six-membered heterocyclic nucleus of the type usual in cyanine dyes such as benzthiazole, benzoxazole, indolenine, naphthoxazole, oxazole, pyridine, quinoline, thiazole, thiazoline, etc., $n$ represents a positive integer of from one to three, $R_1$ represents a hydrogen or an alkyl radical of the same value as R, $R_2$ represents an alkyl mercapto, e. g., methyl mercapto, ethyl mercapto, propyl mercapto, etc., aryl mercapto, e. g., phenyl mercapto, naphthyl mercapto, etc., an anilido group such as anilido, acetanilido or 4-chloroacetanilido groups.

The resulting product obtained by condensing a methylene bis-azole with an alkyl or aralkyl cyclammonium quaternary salt intermediate is then quaternized with a compound having the general formula:

RX wherein R represents an alkyl, or aralkyl group, e. g., methyl, ethyl, propyl, butyl, phenyl, naphthyl, anthranyl, diphenyl, benzyl, methyl benzyl, propyl benzyl, etc., and X represents an acid radical such as chloride, bromide, iodide, perchlorate, sulfonate, sulfate, nitrate, acetate, thiocyanate, or any other acid radical forming an alkyl, or aralkyl ester. The reaction with the ester confers a comparatively high degree of solubility on the alkyl or aralkyl cyclammonium quaternary salt intermediate and the resulting condensation product.

The dye salt thus obtained is readily converted into a different salt, by treating it in solution, with an aqueous solution of a salt containing the desired anion such as, for example, potassium bromide or iodide.

In preparing the sensitizing dyes of the present invention, 1 mol of a methylene bis-azole is heated with 1 mol of a cyanine dye intermediate under reflux conditions in the presence of a basic (acid binding) condensing agent such as pyridine, triethylamine and potassium carbonate, or in the presence of an acid condensing agent such as acetic anhydride, and the like. These condensing agents act as solvents for the reactants, and as catalytic condensing or binding agents. In general, the amount of condensing agent used may vary within wide limits, e. g., from 1 to 25 mols. Concentrations ranging from about 1 mol to about 15 mols are preferred.

When 1 mol of a methylene bis-benzthiazole is heated under reflux conditions with 1 mol of 2($\beta$ acetanilidovinyl) benzthiazole ethiodide in the presence of a condensing agent, such as those described above, for instance, pyridine, a reaction occurs which may be written as follows:

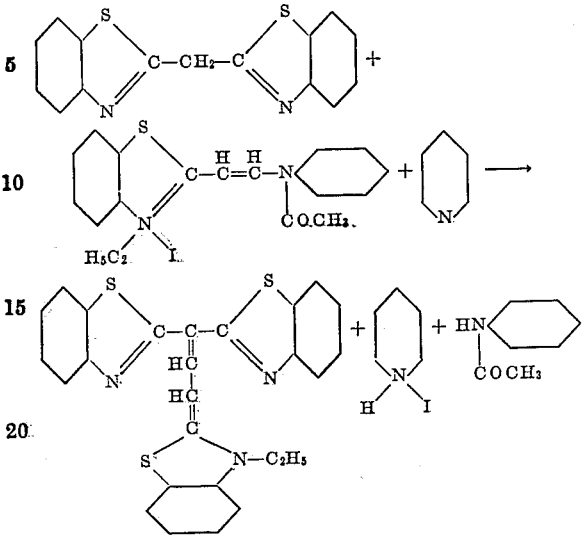

The dye base or intermediate is so numbered that a compound of this type is described as 2,2'-dibenzthiazolyl - 3''-ethyl-2''-(ethylidene) benzthiazolylidene methane. The nomenclature and numbering of the above base or intermediate is in accordance with present usage.

The methods for the preparation of the cyanine dye intermediates are given in the literature. One general method consists of reacting a cyclammonium quaternary salt such as 2-methyl benzthiazole ethiodide with an excess of diphenyl formamidine in acetic anhydride to give 2($\beta$-acetanilidovinyl) benzthiazole.

Typical cyanine dye intermediates which can be employed in the condensation reaction with a methylene bis-azole include: 2($\beta$ acetanilidovinyl) cyclammonium quaternary salt, 2($\beta$ methylmercaptovinyl) cyclammonium quaternary sale, 2($\beta$ methylmercapto-$\beta$-alkyl vinyl) cyclammonium quaternary salt, 2($\beta$ anilino-$\beta$-alkylvinyl) cyclammonium quaternary salt, and 2(4-acetanilidobutadienyl) cyclammonium quaternary salt.

The following examples describe in detail the methods for accomplishing the above objects, but it is to be understood that they are inserted merely for the purpose of illustrations and are not to be construed as limiting the scope of the invention.

EXAMPLE I 3,3'- diethyl - 2,2'-dibenzthiazolyl - 3''- ethyl - 2''-(ethylidene) benzthiazolylidene methane diiodide

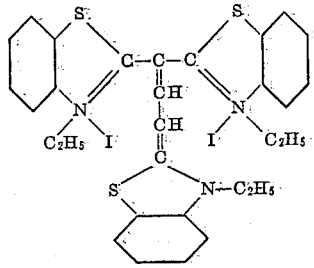

2.8 gms. (1 mol) of methylene bis-benzthiazole prepared according to the "Journal of Chemical Society," 121, p. 464, 1922, and 4.5 gms. (1 mol) of 2($\beta$ acetanilidovinyl) benzthiazole ethiodide were mixed in 20 cc. of pyridine containing 0.5 cc. of triethylamine. The mixture was boiled under reflux for 30 minutes. The mixture was cooled and then diluted with 10 cc. of water, in order to precipitate the base. The dye base was collected on a filter and washed twice with ethyl alcohol. The dye base sensitized both chloride and bromide emulsions, and had a sensitization maximum (flat) at a wave length of about 580 m$\mu$. The alcoholic solution of the intermediate had an absorption maximum at a wave length of about 505 m$\mu$. The intermediate was very soluble in dioxane, but soluble with difficulty in ethyl alcohol.

0.10 gm. of the intermediate thus obtained was dissolved in 10 cc. of dry chlorobenzene and 1 cc. of methyl sulfate added. The mixture was heated at 100° C. for two hours, cooled and then allowed to stand overnight. The dye mixture was then diluted with 10 cc. of dioxane and decanted. The residue obtained was dissolved in 150 cc. of alcohol and 5 cc. of 20% KI solution added. The trinuclear cyanine dye salt precipitated on standing. It was filtered off and after washing with water, the dye was recrystallized from ethyl alcohol as the iodide. The crystals melted at 180 to 185° C. The red alcoholic solution of the dye had a maximum absorption at a wave length of about 542 m$\mu$. The dye was very soluble in alcohol but soluble in dioxane with difficulty.

Incorporated in a gelatino silver chlorobromide emulsion containing about 4-5% of silver chloride, the dye imparts to it a range of added sensitiveness from about 450 m$\mu$, to about 650 m$\mu$ with a maximum at about 600 m$\mu$ which is flat.

Example II 3,3' - diethyl - 2,2' - dibenzoxazolyl - 3'' - ethyl - 2'' - (ethylidene) benzthiazolylidene methane diiodide

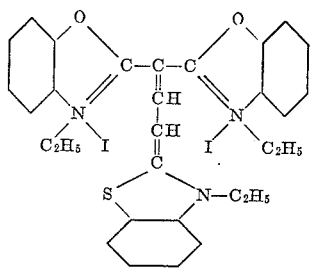

| | | |
|---|---|---|
| Methylene bis-benzoxazole | gm | 0.5 |
| 2($\beta$ acetanilidovinyl) benzthiazole ethiodide | gm | 0.9 |
| Pyridine | cc | 15.0 |
| Triethylamine | drops | 5 |

Methylene bis-benzoxazole was prepared by dry distillation of a mixture of o-amino phenol and malonic acid ethyl ester. The reaction product distilled under 10 mm. pressure at 140-150° C. and was crystallized from a benzene-petroleum ether mixture.

The above reaction mixture was refluxed for 30 minutes, then cooled and water added to near turbidity. Dye base crystals separated on standing which were filtered off and washed with water. The dye was recrystallized from pyridine, diluted with water, and boiled out twice with ethyl alcohol. The dye base crystals had a melting point at about 233° C. The red alcoholic solution had a maximum absorption at a wave length of about 495 m$\mu$.

0.5 gm. of the dye base thus obtained was dissolved in 25 cc. chlorobenzene and 5 cc. methyl sulfate added, and the mixture heated at 100° C. for 2 hours, and then allowed to stand overnight. The liquid was decanted and the oily residue washed with ether. The dye was extracted with alcohol and solidified on standing. It was recrystallized from ethyl alcohol. The residue obtained was dissolved in 15 cc. of alcohol and 5 cc. of 20% KI solution added. The trinuclear cyanine dye precipitated on standing. The red alcoholic solution of the dye had an absorption maximum at a wave length of about 510 m$\mu$.

Incorporated in a gelatino silver chlorobromide emulsion containing about 4-5% of silver chloride, the dye imparts to it a range of added sensitiveness from about 450 m$\mu$ to about 620 m$\mu$ with a maximum at about 560 m$\mu$ which is flat.

Example III 2,2'-dibenzthiazolyl-3''-ethyl-2''-($\beta$ ethyl, ethylidene) benzthiazolylidene methane

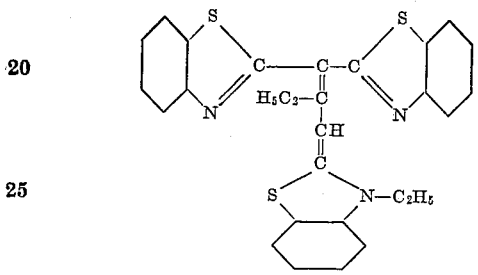

| | | |
|---|---|---|
| 2($\beta$ methyl mercapto-$\beta$-ethylvinyl) benzthiazole ethiodide | gm | 0.5 |
| Methylene bis-benzthiazole | gm | 0.56 |
| iso-Propyl alcohol | cc | 20.0 |
| Triethylamine | drops | 10 |

The above mixture was heated to reflux for 2 hours, cooled and the dye crystals filtered off. The dye base crystals were then washed with methyl alcohol and boiled out twice with ethyl alcohol. Final purification was affected by dissolving the dye base in dioxane, diluting out with alcohol and allowing to stand for 12 hours. The red alcoholic solution of the dye base had an absorption maximum at a wave length of about 530 m$\mu$.

Incorporated in a gelatino silver chloro-bromide emulsion containing about 4-5% of silver chloride, the dye base imparts to it a range of added sensitiveness from about 460 m$\mu$ to about 600 m$\mu$ with a maximum at about 540 m$\mu$ which is flat.

Example IV 2,2'-dibenzthiazolyl-3''-ethyl-6''-methyl - 2'' - ($\beta$ ethyl, ethylidene) benzthiazolylidene methane

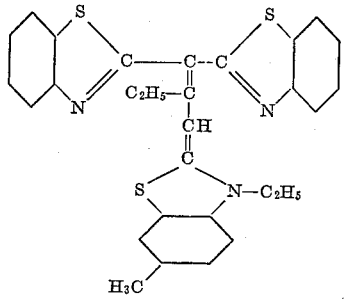

0.5 gm. each of methylene bis-benzthiazole and 2($\beta$ methyl mercapto-$\beta$-ethylvinyl) - 5 - methyl benzthiazole ethiodide were refluxed in 20 cc. of iso-propyl alcohol containing 10 drops of triethylamine for a period of 2 hours. The dark crystalline material which settled out was filtered off and the filtrate diluted with water. The yellow (blue reflex) crystals were recrystallized from alcohol and had a melting point at 230° C.

An alcoholic solution of the dye base had a maximum absorption at a wave length of about 530 mμ.

Incorporated in a gelatino silver chloro-bromide emulsion containing about 4-5% of silver chloride, the dye base imparts to it a range of added sensitiveness from about 460 mμ to about 600 mμ, with a maximum at about 540 mμ which is flat.

EXAMPLE V 2,2'-benzthiazolyl-3''-ethyl-2''-(Δ² butenylidene) benzthiazolylidene methane

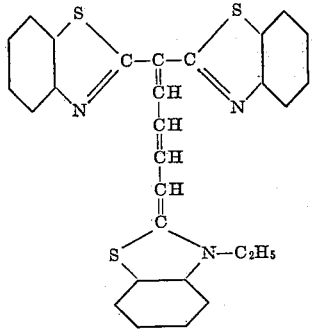

2.3 gms. of 2(4-acetanilidobutadienyl) benzthiazole ethiodide and 1.6 gms. of methylene bisazole were heated to reflux in 20 cc. of dry pyridine containing 0.5 cc. of triethylamine. Refluxing was continued for 1 hour, and the reaction mixture cooled and diluted out with 15 cc. of water. The dye base crystals which separated out were recrystallized from methyl alcohol.

An alcoholic solution of the dye base had an absorption maximum at a wave length of about 590 mμ.

Incorporated in a gelatino silver chloro-bromide emulsion containing about 4-5% of silver chloride, the dye base imparts to it a range of added sensitiveness from about 450 mμ to about 690 mμ with a maximum at about 650 mμ which is flat.

In the preparation of emulsions containing these trinuclear cyanine dye bases and dyes, the base or dye may be dissolved in methyl or ethyl alcohol and the alcoholic solution containing from 5 to 50 milligrams of the dye base or dye added to a liter of emulsion. While in general practice it may not be necessary to add the dye base or dye in the amounts larger than those above given, generally, for satisfactory results, amounts ranging from 5 to 25 milligrams are sufficient to obtain the maximum sensitizing effect. However, I do not wish to limit my invention to the quantities just indicated as the most suitable amount will, in each case, be found by a few comparative experiments. The dye bases or dyes may be added to the emulsion in form of solutions. Suitable solvents as indicated in the examples are the alcohols, for instance, methyl or ethyl alcohol which may be anhydrous or diluted with a small volume of water. In actual practice, the dye bases and dyes are applied to the emulsion during any stage of its production. However, they are preferably added to the finished emulsion before being cast.

While there have been pointed out above certain preferred embodiments of the invention, the same is not limited to the foregoing examples, illustrations or to the specific details given therein, but is capable of variations and modifications as to the reactants, proportions and conditions employed. The nomenclature used is familiar to every chemist and has the advantage of clearness. Accordingly, it is intended that the invention be defined only by the accompanying claims, in which it is intended to include all features of patentable novelty residing therein.

I claim:

1. Compounds of the general formula:

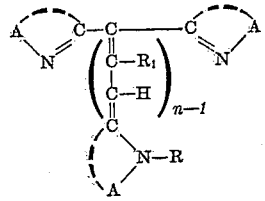

and the quaternary ammonium salts thereof, wherein A represents the atoms necessary to complete a ring of the type usual in cyanine dyes, R represents a member selected from the class consisting of alkyl, alkylene, alkoxy, alkoxyalkyl, acetoxyalkyl, and aralkyl groups, $R_1$ is a member taken from the class consisting of hydrogen and alkyl radicals, and $n$ is a positive integer from one to three.

2. As a new dye the trinuclear cyanine salt of the following structure:

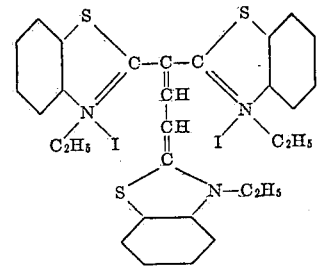

3. As a new dye the trinuclear cyanine salt of the following structure:

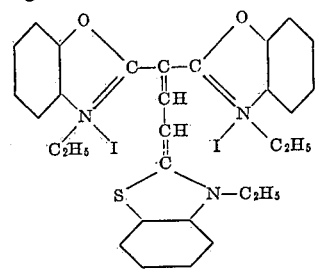

4. As a new dye the trinuclear cyanine base of the following structure:

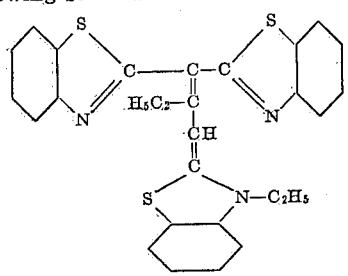

5. A process of preparing a trinuclear cyanine dye which comprises heating in the presence of a basic condensing agent a methylene bis-azole with a cyanine dye intermediate of the following general formula:

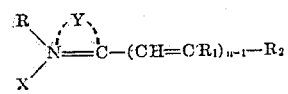

wherein R represents a monovalent radical selected from the group consisting of alkyl, alkylene, alkoxy, alkoxyalkyl, acetoxyalkyl, and aralkyl groups, X represents an anion, Y represents the nonmetallic atoms necessary to complete a heterocyclic nucleus of the type usual in cyanine dyes, $R_1$ represents a member selected from the class consisting of hydrogen and alkyl, $R_2$ represents a member selected from the class consisting of alkyl mercapto, aryl mercapto, and an anilido group, and $n$ is a positive integer of from one to three.

6. A process of preparing a trinuclear cyanine dye which comprises refluxing in the presence of an acid binding agent, one mol of methylene bis-benzthiazole with one mol of 2($\beta$ acetanilidovinyl) benzthiazole ethiodide.

7. A process of preparing a trinuclear cyanine dye which comprises refluxing in the presence of an acid binding agent, one mol of methylene bis-benzoxazole with one mol of 2($\beta$ acetanilidovinyl) benzthiazole ethiodide.

8. A process of preparing a trinuclear cyanine dye which comprises refluxing in the presence of an acid binding agent, one mol of methylene bis-benzthiazole with one mol of 2($\beta$ methyl mercapto-$\beta$-ethylvinyl) benzthiazole ethiodide.

9. The process as defined in claim 5 wherein the heating is conducted under reflux conditions.

ALFRED W. ANISH.

REFERENCES CITED

The following references are of record in the file of this patent:

UNITED STATES PATENTS

| Number | Name | Date |
|---|---|---|
| 2,323,503 | Wilson | July 6, 1943 |
| 2,282,115 | Brooker | May 5, 1942 |

FOREIGN PATENTS

| Number | Country | Date |
|---|---|---|
| 549,202 | Great Britain | 1942 |